(12) United States Patent
Sultan et al.

(10) Patent No.: US 11,466,197 B2
(45) Date of Patent: Oct. 11, 2022

(54) EMULSIFIED SILANE MODIFIED COLLOIDAL SILICA (PICKERING EMULSION) FOR CONFORMANCE CONTROL

(71) Applicant: King Fahd University of Petroleum and Minerals, Dhahran (SA)

(72) Inventors: Abdullah S. Sultan, Dhahran (SA); Tinku Saikia, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/788,807

(22) Filed: Feb. 12, 2020

(65) Prior Publication Data

US 2021/0246361 A1 Aug. 12, 2021

(51) Int. Cl.
*C09K 8/58* (2006.01)
*E21B 33/138* (2006.01)

(52) U.S. Cl.
CPC .............. *C09K 8/58* (2013.01); *E21B 33/138* (2013.01)

(58) Field of Classification Search
CPC . C09K 8/50; C09K 8/502; C09K 8/58; C09K 8/516; C09K 8/42; C09K 8/426; C09K 8/46; E21B 33/13; E21B 33/138
See application file for complete search history.

(56) References Cited

U.S. PATENT DOCUMENTS

| | | | |
|---|---|---|---|
| 3,852,234 A * | 12/1974 | Venema | C08J 3/03 507/120 |
| 4,008,096 A * | 2/1977 | Knapp | C09K 8/502 516/43 |
| 4,442,241 A * | 4/1984 | Drake | C09K 8/502 507/131 |
| 9,951,593 B2 * | 4/2018 | Hussein | C09K 8/516 |
| 10,273,400 B2 | 4/2019 | Sui et al. | |
| 10,329,169 B2 * | 6/2019 | Osness | B01D 17/047 |
| 10,351,756 B2 * | 7/2019 | Hussein | C09K 8/516 |
| 2003/0029615 A1 * | 2/2003 | Maberry | C09K 8/502 166/294 |
| 2008/0009424 A1 * | 1/2008 | Stavland | C09K 8/502 507/224 |

(Continued)

FOREIGN PATENT DOCUMENTS

WO 2014/011549 A2 1/2014
WO 2017/058492 A1 4/2017

OTHER PUBLICATIONS

Cassagnau ; Melt rheology of organoclay and fumed silica nanocomposites ; ScienceDirect Polymer 49 ; pp. 2183-2196 ; Jan. 5, 2008 ; 14 Pages.

(Continued)

*Primary Examiner* — Angela M DiTrani Leff
(74) *Attorney, Agent, or Firm* — Oblon, McClelland, Maier & Neustadt, L.L.P.

(57) ABSTRACT

A silane-modified colloidal silica in the form of a Pickering emulsion and a method for enhancing recovery of hydrocarbons and improving conformance using it. When injected into an oil well, the silane-modified colloidal silica separates into an aqueous phase and oil/oleic phase. The aqueous phase forms a gel that blocks the flow of water and the oleic phase that forms permits oil to flow out of the well.

7 Claims, 22 Drawing Sheets

(56) References Cited

U.S. PATENT DOCUMENTS

| | | | |
|---|---|---|---|
| 2009/0078417 A1* | 3/2009 | Sullivan | C09K 8/56 |
| | | | 166/278 |
| 2015/0197998 A1 | 7/2015 | Kapila et al. | |
| 2021/0230470 A1* | 7/2021 | Abdelfatah | C09K 8/516 |

OTHER PUBLICATIONS

Bjorkegren, et al.; Hydrophilic and hydrophobic modifications of colloidal silica particles for Pickering emulsions; Journal of Colloid and Interface Science vol. 487; pp. 250-257; Feb. 1, 2017; Abstract Only; 2 Pages.

Griffith, et al.; Manipulation of Pickering emulsion rheology using hydrophilically modified silica nanoparticles in brine; Journal of Colloid and Interface Science vol. 509; pp. 132-139; Jan. 1, 2018; Abstract Only; 2 Pages.

* cited by examiner

EMULSIFIED SILANE MODIFIED COLLOIDAL SILICA (PICKERING EMULSION) FOR CONFORMANCE CONTROL

BACKGROUND OF THE INVENTION

Field of the Invention

The invention falls within the fields of petrochemistry and oil and gas production.

Description of the Related Art

Oil and gas production is often accompanied by the production of water which can result from natural water drive or from pressure maintenance techniques such as water injection. In many oil/gas reservoirs, while the use of water flooding has improved oil recovery, it also contributes to production of excess water. For example, it has been reported that approximately every barrel of oil produced in some wells was accompanied by three barrels of water; Khatib, Z.; et al., *Water to value-produced water management for sustainable field development of mature and green fields*. SPE International Conference on Health, Safety and Environment in Oil and Gas Exploration and Production, Kuala Lumpur, Malaysia, Mar. 20-22, 2002, DOI: 10.2118/73853-MS.

The excessive water production from matured petroleum fields costs the petroleum industries huge sums of money and renders the oil wells uneconomical for oil production.; El-Karsani, K. S. M.; et al., *Polymer systems for water shutoff and profile modification: a review over the last decade*. SPE Journal 2014, 19(1), 135-149; Arnold, R.; et al. *Managing water—From waste to resources*, Oilfield Review 2004, 16(2) 26-41; Hibbeler, J. C, et al. *The Environmental Benefits of Reducing Unwanted Water Production*. Asia Pacific Health, Safety and Environment Conference and Exhibition, Kuala Lumpur, Malaysia, Sep. 19-21, 2005; SPE-96582-MS. DOI:10.2118/96582-MS.; Bryant, S. L.; et al., *Polymer gelants for high temperature water shutoff applications*. SPE Journal 1997, 2(4), 447-454; Chauveteau, G.; et al. *New Size-Controlled Microgels for Oil Production*. SPE International Symposium on Oilfield Chemistry, Houston, Tex.; Society of Petroleum Engineers; 13-16 February, 2001, DOI:10.2118/64988-MS; Lane, R. H.; et al. *Gel Water Shutoff in Fractured or Faulted Horizontal Wells*. SPE/CIM International Conference on Horizontal Well Technology, Calgary, Alberta, Canada; Society of Petroleum Engineers; Nov. 6-8, 2000; DOI: 10.2118/65527-MSD; and Broseta, D. et al. *Rheological Screening of Low-Molecular—Weight Polyacrylamide/Chromium(III) Acetate Water Shutoff Gels*. SPE/DOE Improved Oil Recovery Symposium, Tulsa, Okla., 3-5 Apr. 2000. SPE-59319-MS. http:_//dx.doi.org/10.2118/59319-MS.

Excess water production also causes a number of other operational problems including corrosion in flowlines and production systems, hydrostatic loading, and fines migration.

The methods used for the control and treatment of excess water production can be broadly classified as mechanical or chemical methods. The mechanical methods such as using packers for zone isolation and different well recompletion techniques incur high costs.

Chemical methods are generally more cost effective and feasible methods for water shut off. Chemical gel systems were developed for water shut off treatments. These chemical gel treatments can be subdivided as permeability blockers or gelants, disproportionate permeability reducers (DPR), and relative permeability modifiers (RPM); Eoff, L.; et al. *Structure and Process Optimization for the Use of a Polymeric Relative—Permeability Modifier in Conformance Control*. SPE International Symposium on Oilfield Chemistry, Houston, Tex. Feb. 13-16, 2001; Society of Petroleum Engineers; DOI:10.2118/64985-MS.

Chemical systems used for water shut off include polyacrylamide gels, inorganic gel systems, oil soluble silicate gel systems, organically modified silicate gel systems, biopolymers, foams and cement plugging; DiGiacomo, P. M.; et al. *Mechanism of Polyacrylamide Gel Determined by C-13 NMR*. SPE 11787. International Symposium on Oilfield and Geothermal Chemistry, Denver, USA, 1-3 Jun. 1983. DOI: 10.2118/11787-MS; Albonico, P.; et al., *Effective Gelation-Delaying Additives for Cr3+/Polymer Gels*, SPE 25221, presented at the SPE International Symposium on Oilfield Chemistry, New Orleans, USA, 3-6 Mar. 1993; Lakatos, I.; et al., *Application of Silicate-Based Well Treatment Techniques at the Hungarian Oil Field*, SPE Annual Technical Conference and Exhibition, Texas, USA; Oct. 3-6, 1999, DOI: 10.2118/56739-MS; Wellington, S L. *Biopolymer solution viscosity stabilization—polymer degradation and antioxidant use*. SPE $55^{th}$ Annual Fall Conference, Dallas, Tex., USA, Sep. 21-24, 1980; DOI: 10.2118/9296-PA; and Hanssen, J. E., et al., *Increased Oil Tolerance of Polymer-Enhanced Foams: Deep Chemistry or Just "Simple" Displacement Effects*? SPE/DOE Improved Oil Recovery Symposium, Tulsa, Okla., USA, Apr. 3-5, 2000; Society of Petroleum Engineers; DOI: 10.2118/59282-MS.

Particle gel systems, such as preformed particle gel (PPG), pH sensitive gels, submicrogel and bright water, were developed to solve the problems associated with in-situ gel systems such as dilution, chromatographic separation and dispersion of gelant; Chauveteau et al., supra.; Bai, B. et al. *Preformed Particle Gel for Conformance Control: Factors Affecting Its Properties and Applications*. SPE Reservoir Evaluation & Engineering 2007. DOI: 10.2118/89389-PA; Huh, C. et al. *A Rheological Model for pH-Sensitive Ionic Polymer Solutions for Optimal Mobility Control Applications*. SPE Annual Technical Conference and Exhibition, Dallas, Tex., Oct. 9-12, 2005; Society of Petroleum Engineers; DOI: 10.2118/96914-MS; Pritchett, J. et al., *Field Application of a New In-Depth Waterflood Conformance Improvement Tool*. SPE International Improved Oil Recovery Conference in Asia Pacific, Kuala Lumpur, Malaysia; Society of Petroleum Engineers; Oct. 20-21, 2003; DOI: 10.2118/84897-MS; and Zaitoun, A, et al. *Using Microgels to Shut Off Water in a Gas Storage Well*. International Symposium on Oilfield Chemistry, Houston, Tex., U.S.A.; Feb. 28, 2007, DOI: 10.2118/106042-MS.

Nanofluids have been used in the petroleum industry for different applications because to help enhance thermal conductivity and downhole separations. See Wong, K.; et al. *Applications of Nanofluids: Current and Future*. Advances in Mechanical Engineering 2010; 1-11. DOI: 10.1155/2010/519659 and some smart nanofluids were found to be effective for drilling operations and enhancing oil recovery via their special characteristics, such as wettability alterations, modification of surface tension and drag reduction; Chegenizadeh et al., *Application of nanotechnology for enhancing oil recovery—A review*. Petroleum. 2 (4): pp. 324-333, 2016; Jagar, A. A., et al., *Recent advances in application of nanotechnology in chemical enhanced oil recovery: Effects of nanoparticles on wettability alteration, interfacial tension reduction, and flooding. Egyptian Journal of Petroleum 2018, 27(4), 1371-1383; and Agista, M. N., et al., *State-of-the-Art Review of Nanoparticles Application in Petroleum with a Focus on Enhanced Oil Recovery*. Appl. Sci. 2018, 8(871), 1-29.

The use of nanosilica as a water sealant material was also studied, where a chelating agent was used as an activator; Patil, P. R et al. *Environmentally Acceptable Compositions Comprising Nanomaterials for Plugging and Sealing Subterranean Formations*. SPE International Oilfield Nanotechnology Conference and Exhibition, Noordwijk, The Netherlands; Society of Petroleum Engineers; Jun. 12-14, 2012; DOI:10.2118/154917-MS. While these gels restrict the flow of water and stop uneconomical water production, however, a nanosilica fluid when transformed into a gel system in a formation pore matrix not only restricts the water from the production but also restricts the flow of oil. This restriction of the oil flow is not desirable.

The inventors studied this problem and disclose a solution to this adverse effect of nanosilica on the recovery of oil by using an emulsified silica solution as disclosed herein.

SUMMARY OF THE INVENTION

The inventors found that a water-in-oil emulsion comprising an aqueous phase containing a silane-modified silica, an oily phase, such as diesel oil, and an organoclay can effectively be used as a conformance control system in oil fields where other gel systems cause oil zone blockage. These ingredients can form a Pickering emulsion in which the organoclay stabilizes the emulsion.

This water-in-oil emulsion may be injected or pumped into a high temperature reservoir where the emulsion will separate into an aqueous phase and oily phase upon encountering the higher reservoir temperature. The aqueous phase forms a gel which blocks the flow of water while the separated oily phase facilitates the recovery of the hydrocarbon, such as oil or gas.

A general embodiment of the disclosure is a method for enhancing oil recovery, comprising providing the water-in-oil emulsion disclosed herein in communication with a subsurface reservoir containing hydrocarbons. The water-in-oil emulsion of the present disclosure can be introduced into a well bore by any conventional technique such as, but not limited to, being pumped into a drill pipe or other pipe inserted into a wellbore. Further, the well fluids can be recovered using conventional techniques. According to various techniques in the industry, equipment, tools, and the water-in-oil emulsion can be directed from a wellhead into a desired portion of a wellbore. Additionally, the well fluid can be directed from a portion of a wellbore into rock matrix of a zone, such as a pay zone of a subterranean hydrocarbon-bearing formation.

At the higher reservoir temperature, the aqueous phase of the emulsion will form a gel in the presence of an activator, such as sodium chloride. The formed gel blocks the flow of water while the separated oily phase allows the oil to flow.

Aspects of the invention include both the water-in-oil emulsion and its method of use in blocking excess water production while facilitating removal of oil from a high temperature reservoir, especially in low permeability reservoirs.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
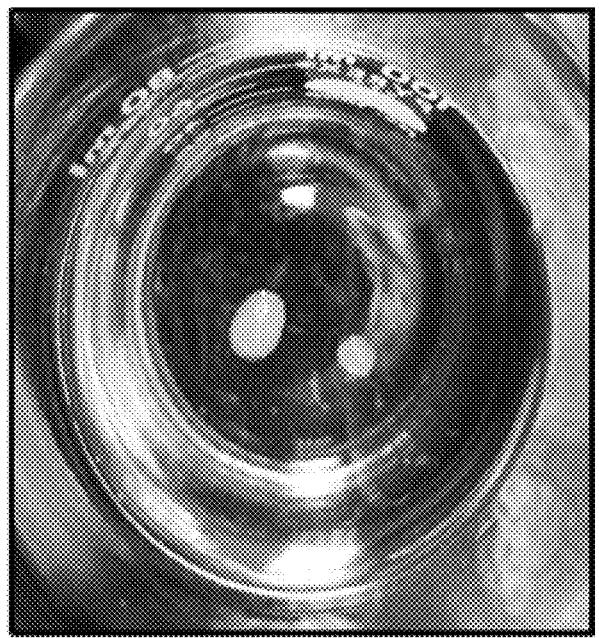
FIGS. 1A-1B illustrate the dilution test of the prepared Pickering emulsion (FIG. 1A) Top View (FIG. 1B) Side view of water/oil emulsion.

The inventors disclose herein an emulsified silane-modified colloidal silica gel solution (Pickering emulsion) as a conformance control system. The emulsified silica solution comprises an aqueous silica solution, an oily phase such as diesel oil, organoclay and an activator such as NaCl. The silane-modified silica is emulsified with diesel oil to produce a continuous phase of diesel oil and a disperse aqueous phase containing the silane-modified silica. The organoclay was used as an emulsion stabilizer instead of other surfactants because of its physical properties such as better thermal stability, reduced drag and higher surface area.

At higher temperatures, the emulsion breaks and provides a movable oleic phase and a rigid gel phase. The oily (oleic) phase will allow the oil to flow towards the production well whereas the gel phase will restrict the flow of water. Initially, the silica nanoparticles in the solution remained in aqueous phase because of high value of zeta potential. The higher value of zeta potential represents the higher repulsion between the particles with same charge. This repulsion prevents the particles from agglomerating with one another. Due to this higher zeta potential value, the colloidal silica initially remains in aqueous phase. When the activator was added into the colloidal silica, the counter ions present in it reduced the zeta potential value and initiated the gelation process at reservoir temperatures.

Embodiments of the invention include, but are not limited to, the following.

One aspect of the invention is directed to a water-in-oil emulsion comprising an aqueous phase comprising silane-modified colloidal silica, organoclay particles, and an oily phase; wherein the organoclay particles in combination with the oily phase and aqueous phase for a Pickering emulsion. In some embodiments of the invention, the water-in-oil emulsion further comprises NaCl or another gelation activator, for example, the gelation activator may be NaCl at a concentration of 0.1, 0.20, 0.25, 0.5, 1.0, 2.0, 3.0 or >3.0 wt. % based on the total weight of the water-in-oil emulsion. In other embodiments, the activator may be added prior to use of the emulsion or admixed into the emulsion during its placement in an oil/gas reservoir.

In some embodiments, the water-in-oil emulsion comprises an aqueous phase comprising from 80, 75, 70, 65, 60, 55 to 50 vol. % and an oily phase ranges from 20, 25, 30, 35, 40, 45, 50 vol. % of the water-in-oil emulsion. Preferably, the aqueous phase comprises from 75 to 65 vol. % and the oily phase comprises from 25-35 vol. % of the water-in-oil emulsion.

In some embodiments, the aqueous silane-modified colloidal silica comprises a water-based epoxy silane-modified colloidal silica, such as Levasil® CC301 (CAS number 1239225-81-0) or its generic equivalent. Levasil® CC301 (CAS number 1239225-81-0) is a water-based epoxy silane-modified colloidal silica dispersion. It is a neutral, aqueous dispersion of colloidal silica that is approximately 28% solids by weight wherein the silica dispersion is sterically stabilized and the amorphous silica particles carry a negative surface charge. Its silica particles are discrete, have a smooth, spherical shape, and are present in a narrow particle size distribution. The particles have also been surface modified with an epoxy silane. The physical appearance of these dispersions is a clear liquid, slightly more viscous than water In some embodiments, the organoclay particles in the emulsion comprise a phyllosilicate, such as Cloisite 20A (CAS number 252254-66-3) or its generic equivalent. The organoclay particles may be present in an amount ranging from 0.25, 0.5, 0.75, 1.00, 1.25, 1.50, 1.75, 2.0 to >2.0 wt. %.

Conveniently, the water-in-oil emulsion comprises an oily phase that is diesel, though in some embodiments other oils or oily substances may be used, such as mineral oil, paraffin oil, fuel oil, crude oil, recycled oil, synthetic oil (including linear alpha olefins and internal olefins), ester oils, glycerides of fatty acids, aliphatic esters, aliphatic ethers, aliphatic acetals, isomerized olefins, other hydrophobic fluids, and mixtures thereof.

Another embodiment of the invention is a gel having a gel strength of E, F, G, H or I as determined by the gel strength code that is produced when the water-in-oil emulsion disclosed herein is activated by contact with a gelation activator and/or by heat, such as at a temperature of at least 90° C. or at least 105° C.

Another aspect of the invention is directed to a method for making the water-in-oil emulsion disclosed herein comprising dispersing the organoclay into the oily phase and admixing the resulting dispersion with an aqueous silane-modified silica thereby forming a water-in-oil emulsion stabilized by organoclay. Conveniently, the organoclay may be Cloisite® 20A or a generic equivalent thereof and the oily phase can be diesel. Typically, NaCl or another gelation activator is admixed with an aqueous phase comprising aqueous silane-modified silica during production of the oil-in-water emulsion. However, in some embodiments the activator may be added to the emulsion immediately prior to, or during, placement of the oil-in-water emulsion in an oil/gas reservoir.

Another aspect of the invention is directed to a method for enhancing oil recovery or conformance improvement comprising injecting the water-in-oil emulsion as disclosed herein into an oil/gas reservoir in the presence of a gelation activator and under conditions where the silane-modified colloidal silica separates into an aqueous phase and oil/oleic phase, and the aqueous phase forms a gel that blocks the flow of water and the oleic phase permits oil to flow. Such improvement can improve recovery of oil or gas while reducing the recovery of water, such as produced water from a reservoir.

Conveniently, a gelation activator that is NaCl is added to the water-in-oil emulsion in an amount ranging from 0.10, 0.20, 0.25, 0.50, 0.75, 1.00, 1.25, 1.5, 1.75, 2.00, 2.50, to 3.00 wt % salt based on a total weight of the water-in-oil emulsion. In some embodiments other gelation activators may be used that induce gelation of the aqueous phase of the emulsion when the emulsion is heated, such as under conditions in an oil/gas reservoir above ambient or room temperature, for example, to a temperature of at least 90, 95, 100, 105, 110, 120, 130, or >130° C.

Silane-modified colloidal silica/Aqueous phase. The water-in-oil emulsion as disclosed herein comprises as one ingredient a silane-modified colloidal silicas in an aqueous phase. Preferably, the silane-modified colloidal silica is Levasil CC301@ (CAS number 1239225-81-0) which is a water-based epoxy silane-modified colloidal silica or its generic equivalent. Levasil® CC301 is a neutral, aqueous dispersion of colloidal silica that is approximately 28% solids by weight. The silica dispersion is sterically stabilized and the amorphous silica particles carry a negative surface charge. The silica particles are discrete, have a smooth, spherical shape, and are present in a narrow particle size distribution. The particles have also been surface modified with an epoxy silane. "Hydroxyl number" for 2-pack systems; 0.45 mole OH/kg product. The physical appearance of the dispersion is a clear liquid, slightly more viscous than water. Preferably, the silane-modified colloidal silica is a water-based epoxy silane-modified colloidal silica dispersion such as Levasil CC301.

In other embodiments, other kinds of colloidal silica may be silane-modified including colloidal silicas, such as Levasil® colloidal silicas. Such silicas may have a concentration of $SiO_2$ ranging from 7 to 50 wt. %, may contain spherical or irregular particles ranging in size from 2, 5, 10, 20, 50, 100 to 150 nm and narrow, medium, or wide particle size distributions and have surface areas ranging from 30, 50, 100, 200, 300, 400, 500, 600, 700, 800, 900, 1,000 to 1,100 $m^2/g$, and have a pH ranging from 2, 3, 4, 5, 6, 7, 8, 9, 10, 11 to 12. In some embodiments, the colloidal silica or silane-modified colloidal silica may comprise discrete particles and/or chains. In some embodiments a colloidal silica or silane-modified silica will be modified with ammonium, aluminate, chloride, or be deionized.

In one embodiment the silane-modified colloidal silica has a density ranging from 1.05, 1.10, 1.15, 1.20, 1.25 to about 1.30 $g/cm^3$, a dynamic viscosity at 20° C. ranging from about 3, 3.2, 3.4, 3.6, 3.8, to about 4 cP, a pH ranging from about 5.5, 6.0, 6.5 to about 7.0 and a silica content ranging from about 25, 30, to 35 wt. %.

A colloidal silica may be modified with a silane, including but not limited to chloromethyl-triethoxy silane (CMTE), 3-chloropropyl-triethoxy silane (CPTE), 3-glycidoxypropylmethyl-diethoxy silane (GPMDE), 3-methacryloxypropyl-trimethoxy silane (MPTM), methyl-poly(ethylene glycol)-trimethoxy silane (MPEGTM), 3-aminopropyl-triethoxy silane (APTE) and 3-glycidoxypropyl-triethoxy silane (GPTE). Other non-limiting examples of compounds that may be used to functionalize the surface of the silica particles include aminoalkylsilanes such as aminopropyltriethoxy silane, aminomethyltriethoxysilane, trimethoxy[3-(phenylamino)propyl]silane, and trimethyl[3-(triethoxysilyl)propyl]ammonium chloride; alkoxyorganomercapto silanes such as bis(3-(triethoxysilylpropyl) tetrasulfide, bis (3-(triethoxysilylpropyl) disulfide, vinyltrimethoxy silane, vinyltriethoxy silane, 3-mercaptopropyltrimethoxy silane; 3-mercaptopropyltriethoxy silane; 3-aminopropyltriethoxysilane and 3-aminopropyltrimethoxysilane; and alkoxysilanes.

Methods of silane modification of a colloidal silica, such as the unmodified colloidal silicas above, are known in the art and are incorporated by reference to hypertext transfer protocol://publications.lib.chalmers.se/records/fulltext/256531/256531.pdf (last accessed Jan. 14, 2020. In some alternative embodiments, a pickering emulsion as disclosed herein may comprise Levasil CC151 (CAS number—1239225-81-0) [Silica—15 wt %, Density-1.1 g/cm$^3$, Average Particle Size—5 nm, pH—11, Viscosity—3 cP]; Levasil OF75 (CAS number-7631-86-9) [Silica—15 wt %, Density-1.1 g/cm$^3$, Specific surface area-750 m$^2$/g, pH—10.5, Viscosity—8 cP]; or Levasil OF8 (CAS number—7631-86-9) [Silica—50 wt %, Density-1.4 g/cm$^3$, Specific surface area-80 m$^2$/g, pH—9.5, Viscosity—8 cP].

Oily or oleic phase. The water-in-oil emulsion of the invention comprises an oily phase and an aqueous phase. The oily phase can comprise diesel oil, mineral oil, paraffin oil, fuel oil, crude oil, recycled oil, synthetic oil (including linear alpha olefins and internal olefins), ester oils, glycerides of fatty acids, aliphatic esters, aliphatic ethers, aliphatic acetals, isomerized olefins, other hydrophobic fluids, and mixtures thereof. Preferably the oily phase comprises diesel oil.

Pickering emulsion. A Pickering emulsion is an emulsion that is stabilized by solid particles (for example colloidal silica) which adsorb onto the interface between the two phases. This type of emulsion was named after S. U. Pickering, who described the phenomenon in 1907. If oil and water are mixed and small oil droplets are formed and dispersed throughout the water, eventually the droplets will coalesce to decrease the amount of energy in the system. However, if solid particles are added to the mixture, they will bind to the surface of the interface and prevent the droplets from coalescing, making the emulsion more stable.

Organoclay. Emulsions are also unstable thermodynamic systems formed by two immiscible phases, oil and water. To help stabilize emulsions of the aqueous and oily phases the inventors incorporated organoclay particles. Thus the water-in-oil emulsion of the invention comprises organoclay particles such as an organophilic phyllosilicate like Cloisite® 20A (CAS number: 252254-66-3) or another montmorillonite clay modified with a quaternary ammonium salt as an emulsion stabilizer. In one embodiment the organoclay is montmorillonite clay modified with dimethyldyhydrogenated tallow quaternary ammonium chloride. A phyllosilicate has tetrahedral silicate groups linked in sheets. Typical properties of a suitable organophilic phyllosilicate include a bulk density ranging from about 310, 350 to about 390 kg/m$^3$; preferably about 350 kg/m$^3$; a density at 68° C. of about 1.60, 1.80 to about 2.00 g/cm$^3$, preferably about 1.80 g/cm$^3$; a particle size, $D_{50}$ ranging of less than 8, 9, 10, 11 or 12 µm, preferably less than 10 µm; a moisture content ranging from about 2.2, 2.5, to about 2.8 wt. %, preferably less than about 2.5 wt %; and lamellar spacing (XRD, $d_{001}$) of about 2.4, 2.7, to about 3.00 nm, preferably about 2.7 nm.

Ratios of ingredients. A ratio of the oily (oleic) phase to the aqueous phase containing the silane-modified silica can range from 10:90, 20:80, 25:75, 30:70, 40:60 or 50:50 vol. %. Preferably the ratio of the oily phase to aqueous phase is about 30 vol. % to about 70 vol. %.

The organoclay is present in the emulsion in an amount sufficient to stabilize the emulsion by preventing emulsion droplets from coalescing with one another. These organoclay particles provided the desired stability to the emulsion. In some embodiments, the organoclay is present in the water-in-oil emulsion in an amount (wt % based on the total weight of the water-in-oil emulsion) ranging from 0.025, 0.05, 0.075, 0.1, 0.125, 0.15, 0.175, 0.2, 0.25, 0.3, 0.4, 0.5, 1, 2, 5, 10, to 20 wt %. In some embodiments about 500 ppm or 0.05 wt. %, about 100 ppm or 0.1 wt. %, or about 1,500 ppm or 0.15 wt. %. In one embodiment a concentration of at least about 500 ppm is used to facilitate breaking of the emulsion after a period of time at high temperature.

Other additives may be included in some embodiments of the water-in-oil emulsion disclosed herein such as wetting agents, other organophilic clays, viscosifiers, fluid loss control agents, surfactants, dispersants, interfacial tension reducers, pH buffers, mutual solvents, thinners, thinning agents, and cleaning agents. The addition of such agents should be well known to one of ordinary skill in the art of formulating wellbore fluids and muds. pH range of produced water or brine in an oil/gas reservoir may range from 2, 3, 4, 5, 6, 7, 8 to 9.

Temperature ranges. An oil/gas reservoir may have a temperature <80, 80, 85, 90, 95, 100, 100, 110, 120, 130 140, 150, 160, 170, 180, 190, 200, >200° C.

Permeability. An oil/gas reservoir may have a permeability ranging from 0.001 mD (1 µD) to 0.1 mD (100 µD) where mD is refers to a milliDarcy. Advantageously the silica gel emulsion system disclosed herein provides conformance control in highly fractured zones and in reservoirs with high permeability such as those characterized by about 200, 210, 220, 230, or 240 mD, preferably about 220 mD. Preferably, the pH ranges from about 5.5, 6, 6.5, 7, 7.5, 8.0 to 8.5 the temperature ranges from about 90, 100, 110 to 120° C., the salinity ranges from about 2,000, 3,000, 4,000 to 5,000 ppm. Preferably, low permeability reservoirs are not targeted.

EXAMPLE

Materials. The emulsion solution prepared was water-in-oil emulsion system. The continuous phase was diesel and the dispersed phase was aqueous silane modified colloidal silica. The silane modified colloidal silica (Levasil® CC301) was obtained from AkzoNobel. The colloidal silica had a density of approximately 1.188 g/cm$^3$ and dynamic viscosity of 3.6 cP at 20° C. The pH was 6.3 and silica content was approximately 28.1%. The diesel was purchased from a local gas station. The organoclay Cloisite® 20A used as an emulsifier was received from BYK, United Kingdom. The sodium chloride was used as an activator for the colloidal silica and purchased from PanReac AppliChem, Spain.

Procedures and Instrumentation. The emulsion was prepared using Silverson L5M-A mixer. The oil phase and the aqueous phase were maintained in the ratio of 30 vol % and 70 vol % respectively. The organically modified phyllosilicate (Cloisite® 20A) was dispersed into the oleic phase by stirring at 1600 rpm for about 15 minutes. The activator sodium chloride was mixed into the aqueous phase of silane modified colloidal silica by stirring the solution for 15 minutes at 700 rpm. Then the aqueous phase was added to the oleic phase dropwise at a rate of 5 cc/minute by continuously increasing the stirring rate from 700 rpm to 4,000 rpm. After the addition, the solution was stirred for about 1 minute at 10,000 rpm. The emulsified gel system was prepared with three different concentrations of the activator (sodium chloride) i.e., 0.5 wt %, 1.0 wt % and 1.5 wt %.

The prepared emulsion was checked for its characteristics such as emulsion type by dilution test, pH and conductivity measurement using Thermo Scientific Orion Star A215 meter. Leica DM2000 microscope was used for the microscopic observation of the prepared emulsion.

Stability Test. The stability of the prepared emulsion was tested via bottle test. The bottle test was conducted at ambient condition and at higher temperature of 105° C. The stability of the emulsion was measured in terms of volume percentage of oil/water separated from the emulsion. Conical graduated tubes were used for this purpose, which can withstand exposer to higher temperatures. The test was conducted for all the samples and the oil/water separation volume percentage was measured up to 24 hours. The stability test also helps in identifying gel strength code and determining approximately the total time required for the gelation of the emulsion. The vial inversion test was performed for the same and Sydnask code (Table-1) was used to grade the gel strength.

Rheological Characteristics. For the rheological characteristics study of the prepared emulsion, Discovery Hybrid Rheometer DHR-3 from TA Instruments was used. The bob & cup geometry of 26 mm and 28 mm diameter respectively was used. The rheometers torque was ranged in between 100 $\mu$N·m (Newton meter) to 0.2 N·m and the temperature can be varied from −10 to 150° C. The dynamic oscillatory test was performed using the rheometer within the linear viscoelastic range of the emulsified gel solution. The strain percentage was set at 1.21265% and angular frequency of 10 rad/sec was maintained during the dynamic oscillatory test. The emulsified gel solution with salt (NaCl) concentrations of 0.5 wt %, 1.0 wt % and 1.5 wt % was tested at 95° C.

Characterization of emulsified gel. After the preparation of the emulsion, it was tested for the type of emulsion using dilution test. The emulsified gel droplet was dropped into water phase in a beaker, if the droplet of emulsion dispersed then it indicates the emulsified gel is oil-in-water emulsion (direct emulsion) and if the droplet do not disperse in water then the emulsified gel is water-in-oil emulsion (invert emulsion). The dispersion of the oil-in-water emulsion droplet in water is due to the same continuous phase of emulsion droplet.

Figure 1B:
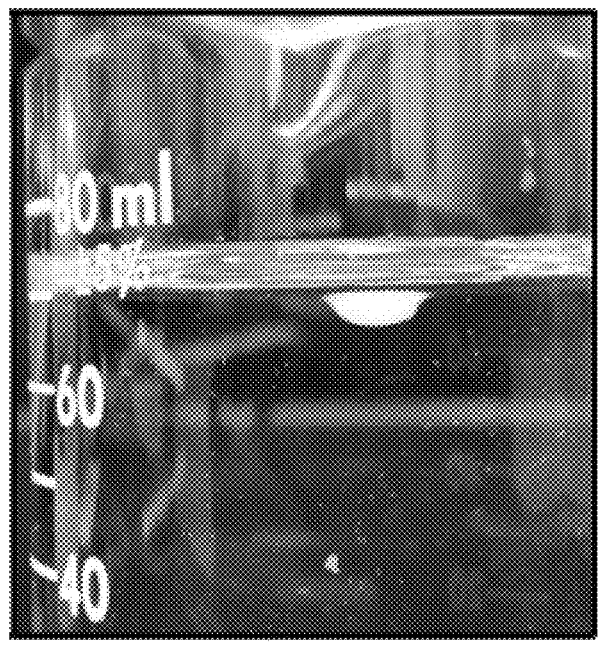
Figure 2A:
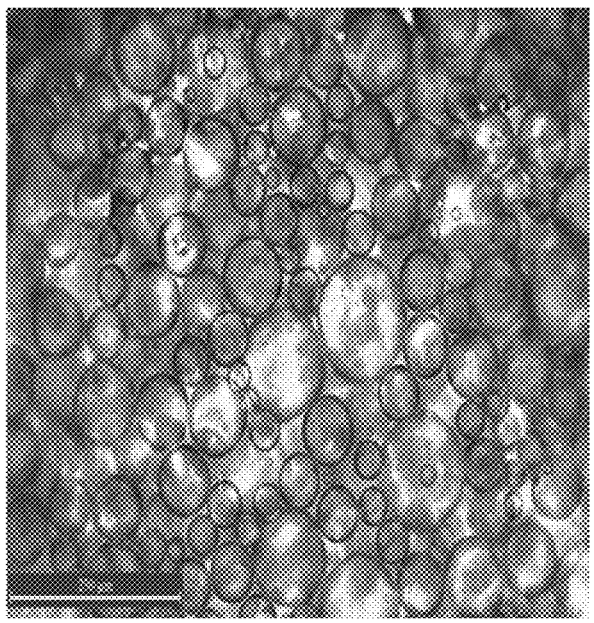
FIGS. 2A-2B illustrate Optical microscopic Images of the Pickering emulsion (FIG. 2A) 10× (2B) 20 к.
Figure 2B:
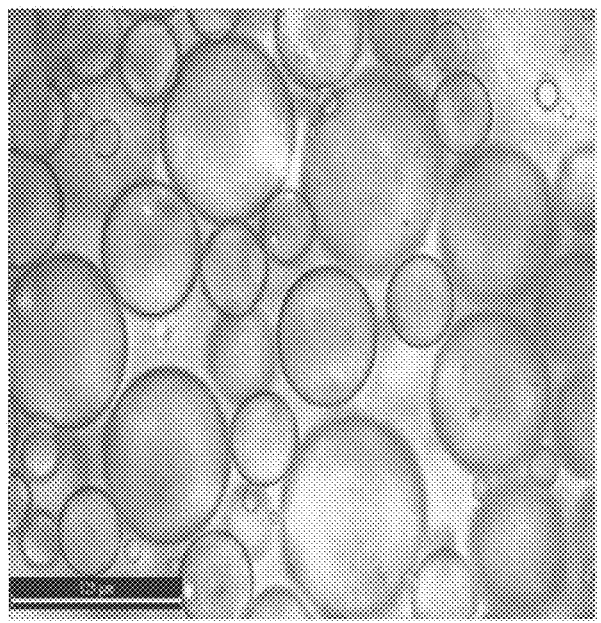

The prepared emulsion was found to be a water-in-oil emulsion (invert emulsion) as shown in FIG. 1. The conductivity of the emulsified gel was found to be 0.028 $\mu$s/cm at 21.5° C., which also confirms that the continuous phase in the prepared emulsified gel was diesel oil. The pH of the emulsified sample was found to be 7.16 at 21.5° C. In the microscopic image of the emulsified gel droplet (FIG. 2), it was clearly seen that the emulsion droplets varied in droplet size and they are stable. The emulsion droplets are not coalescing with one another because of the presence of the organoclay particles at the surface of the droplets. These organoclay particles provided the desired stability to the emulsion.

Emulsified gel thermal stability. The emulsified gel solution was tested for its thermal stability via bottle test. The emulsified gel solution was poured into the caped conical graduated tubes. The tubes were subjected to higher temperature of 105° C. in the oven and ambient temperature. After every 30 minutes the state of the emulsion solution was checked. The oil which separated out of the emulsion solution was collected at the top due to the density difference and the separated aqueous phase would be settled in the bottom.

Figure 3:
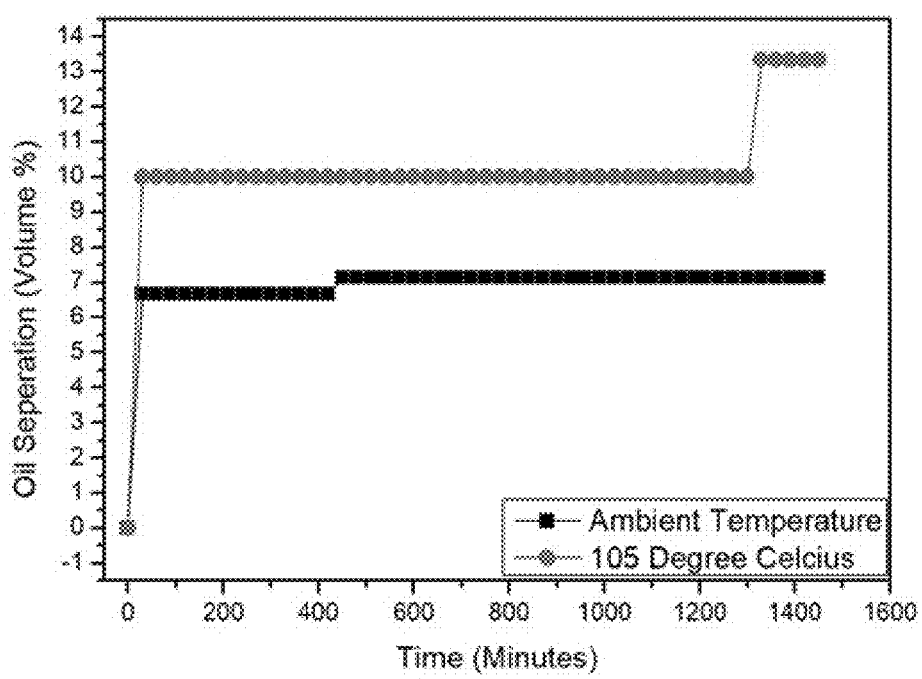
FIG. 3 is a graph illustrating the Emulsion I thermal stability at 105° C.

In the emulsified gel solution (Emulsion I) with 0.5 wt % of sodium chloride there was no initial instant separation of oil phase in both the conical tubes subjected to 105° C. and ambient temperature. After the first 30 minutes, the oil separation of 10 vol % was seen at 105° C. and 6.66 vol % separation at ambient conditions (FIG. 3). The oil separation volume percentage increased from 10 vol % to 13.33 vol % at 1330 minutes in the tube at temperature of 105° C. and remained at this level up to 24 hours. In the tube at ambient conditions the oil separation volume increase was seen after approximately 450 minutes from initial 6.66 vol % to 7.14 vol % and it remained at this value till 24 hours.

Figure 4:
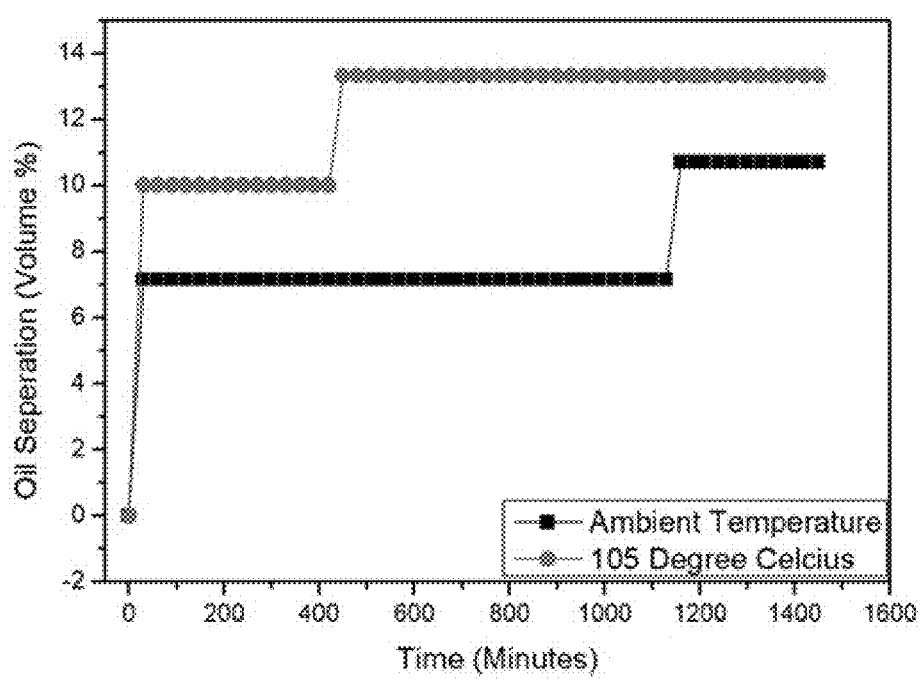
FIG. 4 is a graph illustrating the Emulsion II thermal stability at 105° C.

In the emulsified gel solution with 1.0 wt % salt concentration (Emulsion II) the oil separation of 10 vol % was seen in the first 30 minutes at 105° C. (FIG. 4). In the ambient temperature (25° C.) the oil separation volume percentage was 7.14 vol % after first 30 minutes. The next increase in oil separation volume percentage at 105° C. was seen after 450 minutes, the oil separation volume increases from 10 vol % to 13.33 vol % and remained at that level till 24 hours. In the ambient conditions the oil separation volume percentage increased from initial 7.14 vol % to 10.71 vol % after 1160 minutes and remained at this level till 24 hours.

Figure 5:
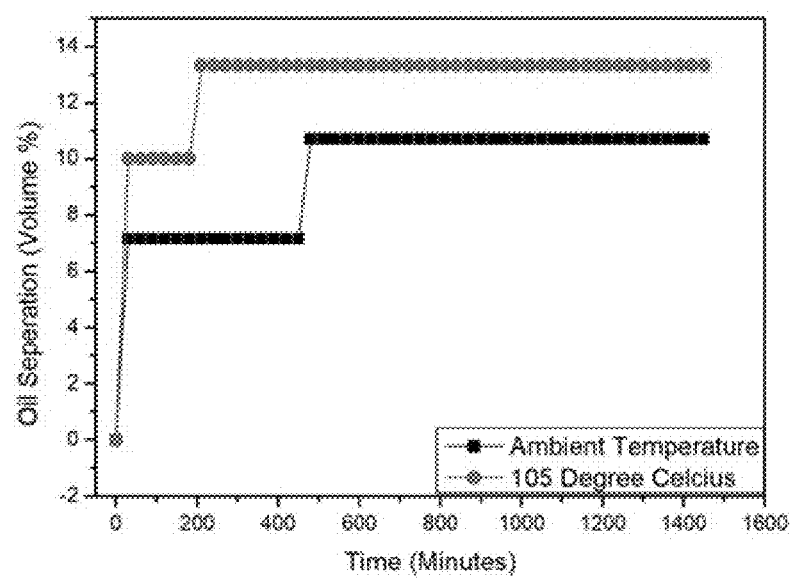
FIG. 5 is a graph illustrating the Emulsion III thermal stability at 105° C.

A similar trend was seen in the emulsified gel solution (Emulsion III) with 1.5 wt % salt (FIG. 5). After first 30 minutes, the separated oil volume percentage was 10 vol % at 105° C. and 7.14 vol % at ambient conditions. The oil separation volume percentage at 105° C. was increased from initial 10 vol % to 13.33 vol % at approximately 210 minutes and remains at this level till 24 hours. In ambient conditions the oil separation volume percentage was increased from 7.14 vol % to 10.71 vol % at 480 minutes approximately.

From the stability test it was clear that increase in salt concentration does affect the stability of emulsion. With the increase in salt concentration the same oil separation volume percentage was seen earlier in comparison to solutions with lower salt concentration. Also, the temperature affects the stability of emulsion adversely. The emulsion was more stable at ambient temperature in comparison to 105° C. The effect of temperature on the emulsion stability is desirable for the success of conformance control as the emulsion was designed to separate into oleic phase and aqueous phase in the reservoir.

Figure 6A:
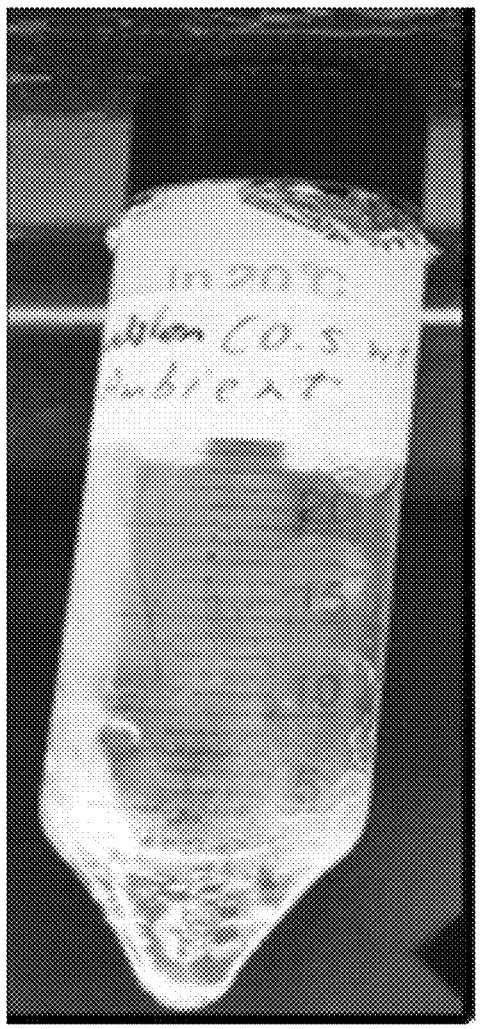
FIGS. 6A-6F illustrate vial inversion test (After 24 hours). Image (FIGS. 6A, 6B, 6C) at ambient temperature; Image (FIGS. 6D, 6E, 6F) at 105° C.
Figure 6B:
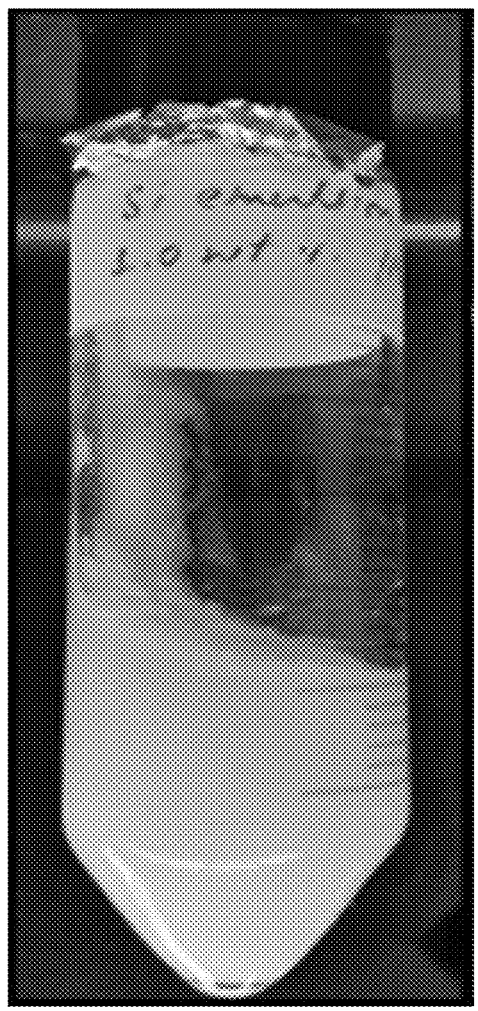
Figure 6C:
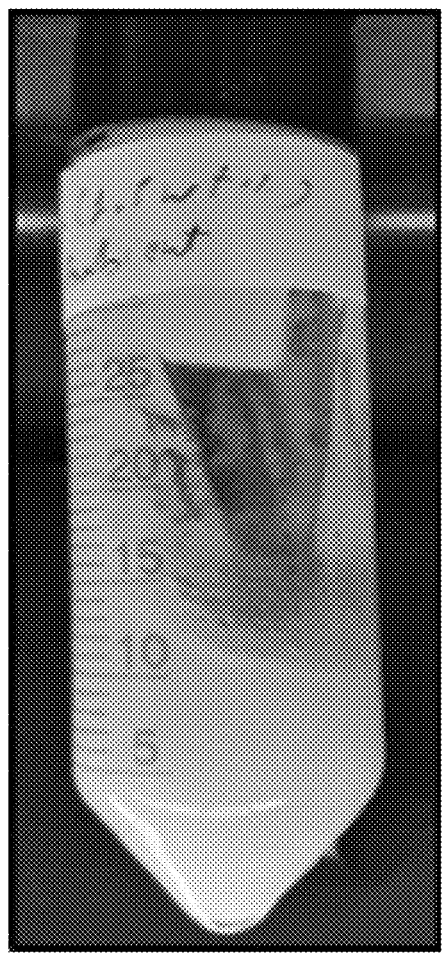
Figure 6D:
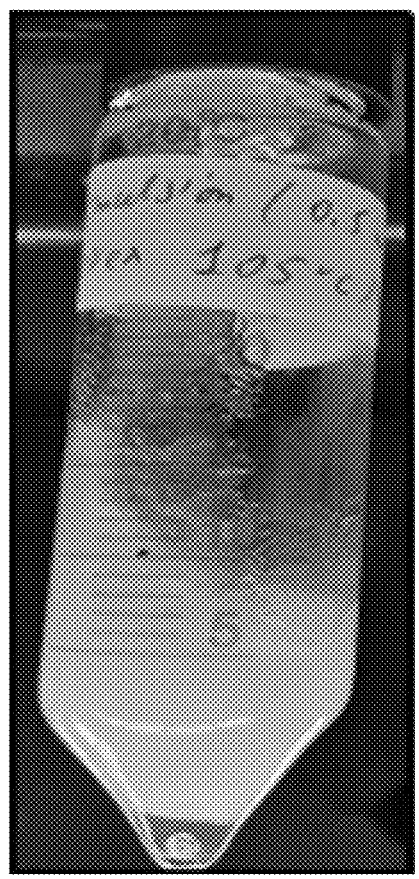
Figure 6E:
Figure 6F:
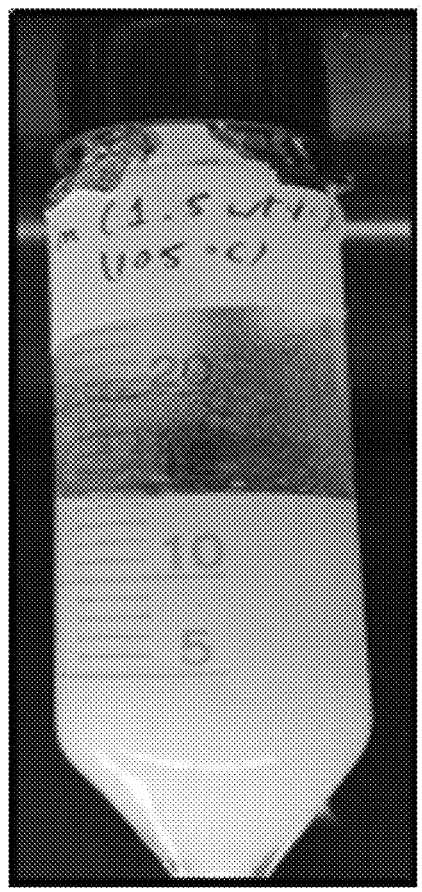

Gelation of emulsified silica. The gelation of the emulsified gel solution was studied with the help of vial inversion test. The conical vials were filled with emulsified solution and subjected to 105° C. in the oven as well as to ambient conditions. The state of emulsified gel solution was checked once after 24 hours and after 48 hours. To quantify the gelation or gel strength of the formed gel, Sydansk gel strength code was used (Table 1). It was seen that after 24 hours in the emulsified gel solution with 0.5 wt % sodium chloride (Emulsion I) there is no gel formation and the Sydansk code is A at ambient conditions(FIG. 6A), whereas at 105° C. the Sydansk code was found to be E (FIG. 6D). Code E represents barely flowing gel. In emulsion II (with 1.0 wt. % NaCl) the gel strength at ambient condition was found to be code E (FIG. 6B) and at 105° C. it was found to be code F (FIG. 6E). Similarly, in the emulsion III (with 1.5 wt. % NaCl) at ambient condition the gel strength code was E (FIG. 6C) whereas the sample at 105° C. was found to be of code I (FIG. 6F). The increase in gelation was because of increase in the amount of sodium chloride (activator).

TABLE 1

Sydnask Gel Strength Code

| Gel Strength Code | Gel Description |
|---|---|
| A | No detectable gel formed: The gel appears to have the same viscosity as the original polymer solution |
| B | Highly flowing gel: The gel appears to be only slightly more viscous than the initial polymer solution |
| C | Flowing gel: Most of the gel flows to the bottle cap by gravity upon inversion |
| D | Moderately flowing gel: Only a small portion (5-10%) of the gel does not flow to the bottle by gravity upon inversion (usually characterized as a tonguing gel) |
| E | Barely flowing gel: The gel can barely flow to the bottle cap and/or a significant portion (>15%) of the gel does not flow by gravity upon inversion |
| F | Highly deformable non flowing gel: The gel does not flow to the bottle cap by gravity upon inversion |
| G | Moderately deformable non flowing gel: The gel deforms about halfway down the bottle by gravity upon inversion |
| H | Slightly deformable non flowing gel: Only the gel surface slightly deforms by gravity upon inversion |
| I | Rigid gel: There is no gel surface deformation by gravity upon inversion |

TABLE 2

Gel Strength of the emulsified gel system after 24 & 48 Hours

| Time | Temperature (° C.) | Gel Strength Code | | |
|---|---|---|---|---|
| | | Emulsion I | Emulsion II | Emulsion III |
| After 24 hrs | 25 | A | E | E |
| | 105 | E | F | I |
| After 48 hrs | 25 | A | E | E |
| | 105 | H | I | I |

Figure 7A:
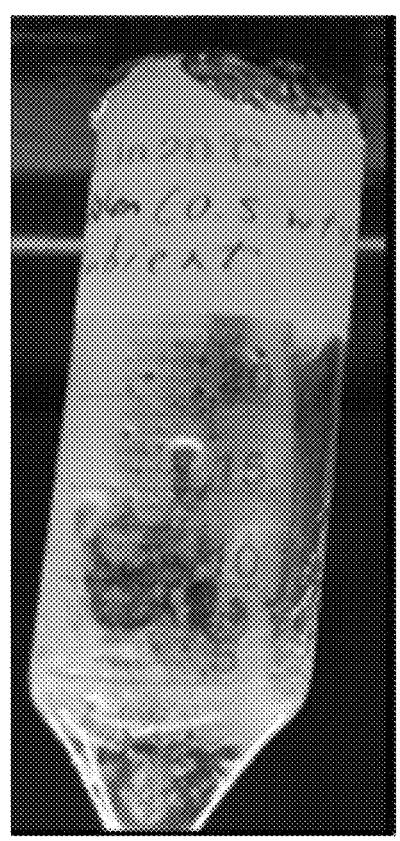
FIGS. 7A-7F illustrate a vial inversion test (After 48 hours). Image (FIGS. 7A, 7B, 7C) at ambient temperature; Image (FIGS. 7D, 7E, 7F) at 105° C.
Figure 7B:
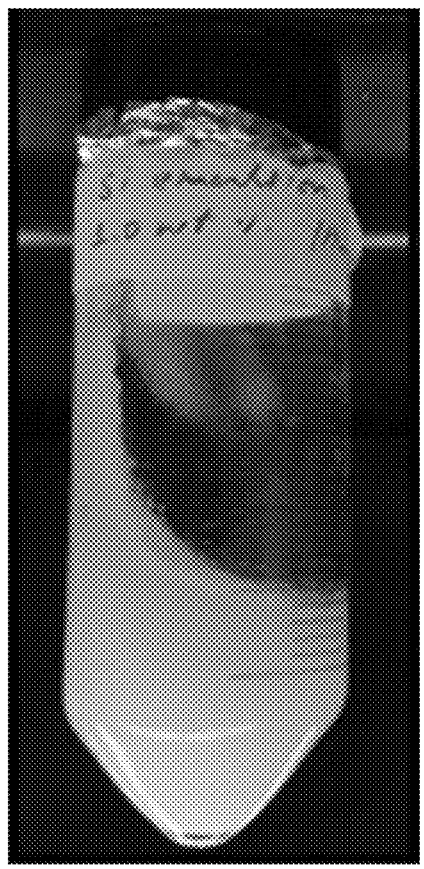
Figure 7C:
Figure 7D:
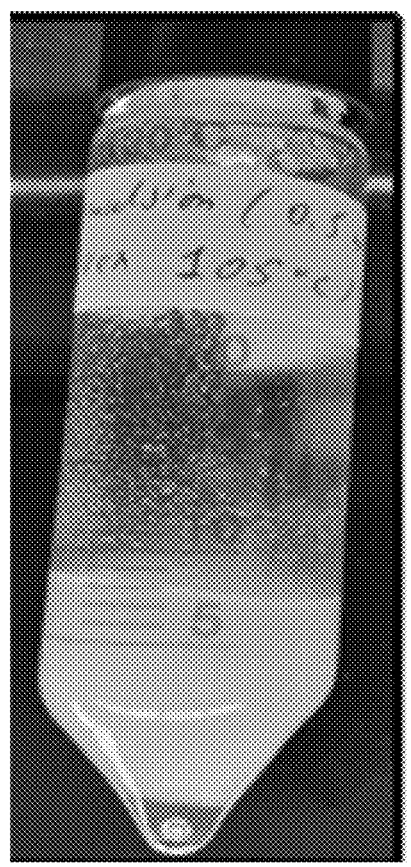
Figure 7E:
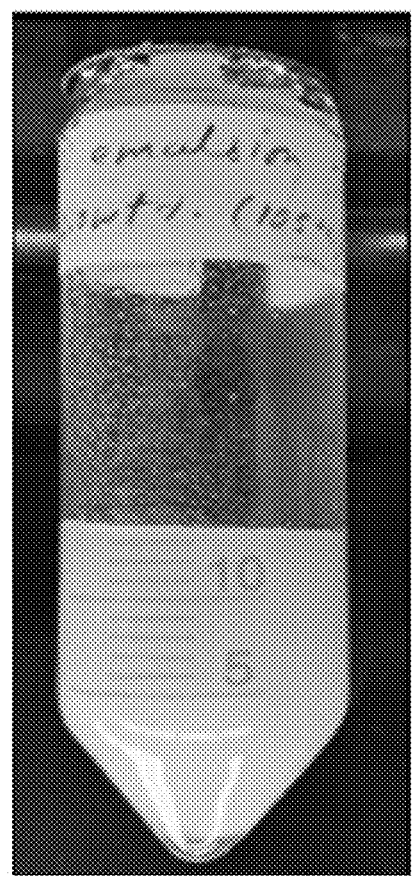
Figure 7F:
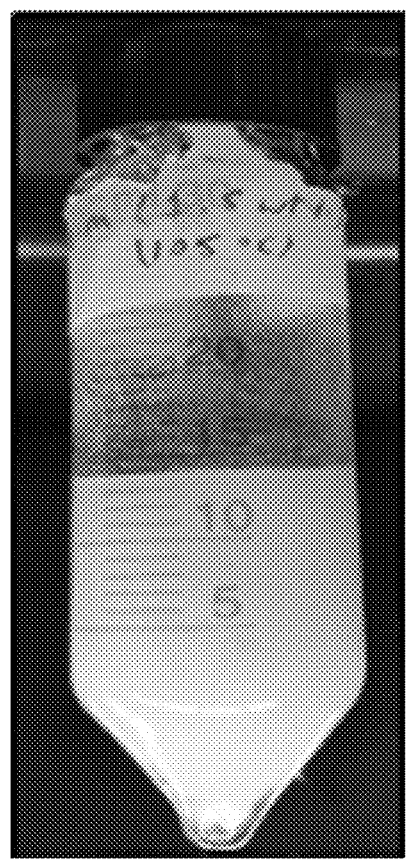

After 48 hours, the emulsion I showed no improvement in gel strength and the gel strength remains at code A at ambient conditions (FIG. 7A). Whereas at temperature of 105° C. the gel strength of emulsion I was improved from code E to code H, (FIG. 7D). In emulsion II and emulsion III at ambient temperature there seems to be no change in the gel strength code, both with code E even after 48 hours (FIG. 7B, 7C). However, the gel strength of the emulsion II was upgraded to code I, representing rigid gel at 105° C. (FIG. 7E). The gel strength of emulsion III at 105° C. remains the same as code I even after 48 hours (FIG. 7F). These results show that at lower concentration of activator the emulsified solution will not form any gel under ambient conditions but that increasing the concentration of activator will results in gelation. The higher temperature did increase the gelation process even at lower activator concentrations.

Rheokinetic gelation study of emulsified silica. To evaluate the effects of emulsification on the gelation of the silane modified colloidal silica, a rheokinetic study of the prepared emulsion solution was performed. The gelation kinetics of the emulsified silane modified colloidal silica were studied at a temperature of 95° C. and the rheological characteristic "storage modulus" of the emulsion solution was measured with respect to time in the rheometer.

The emulsion solutions were classified as Emulsion I, II and III depending upon the concentration of activator i.e., 0.5 wt % NaCl, 1.0 wt % NaCl and 1.5 wt % NaCl respectively.

The gel is a three-dimensional network structure which was formed due to physical or chemical interactions of the flexible chains. The graphical plot of the storage modulus verses time can be distinctly divided into three regions as described by Mohamed, A. I. A.; *Gelation of emulsified polyacrylamide/polyethylenimine under high-temperature, high-salinity conditions: rheological investigation.* Ind. Eng. Chem. Res. 2018, 57 (36), 12278-12287.

An induction phase in which the value of storage modulus was very low because of lower elasticity of the material being investigated.

The second stage is an inflection stage in which a sudden rise in the value of storage modulus can be seen. The point of inflection is considered as the gelation point. At this point the 3D network structure is developed due to excessive particle to particle interaction as described by Sacks, M. D. et al. *Rheological properties of silica sol-gel materials.* Journal of Non-Crystalline Solids 1987, 92(2-3), 383-396. The shape of this region can be varied depending upon the material in investigation and test parameters.

In the last phase an equilibrium state is obtained.

Figure 8:
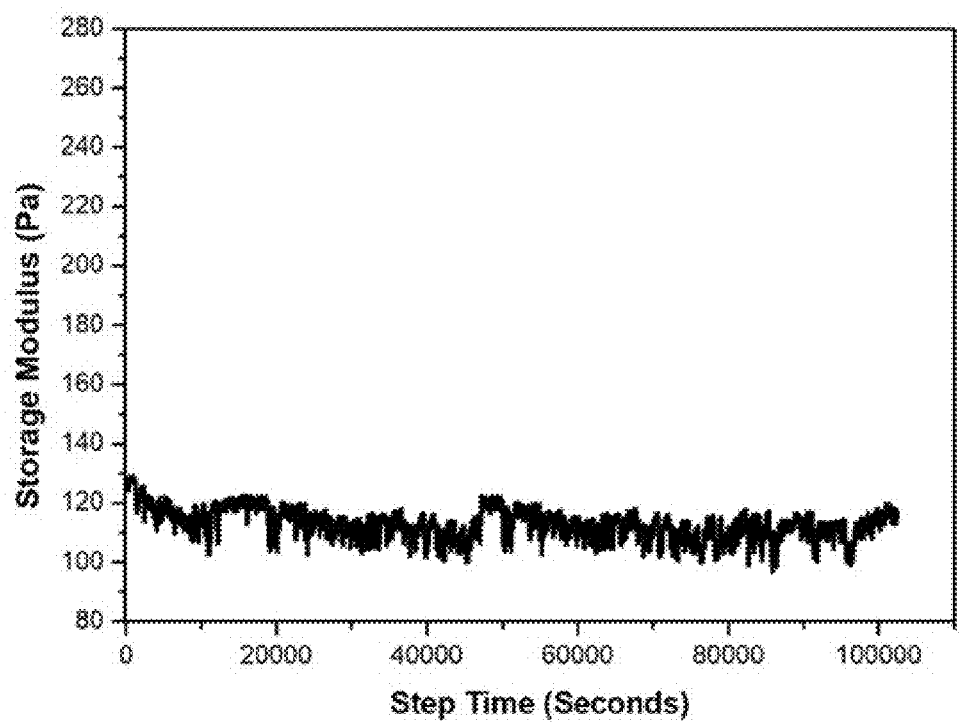
FIG. 8 is a graph illustrating the gelation kinetics of emulsion I at 95 degrees Celsius.
Figure 9:
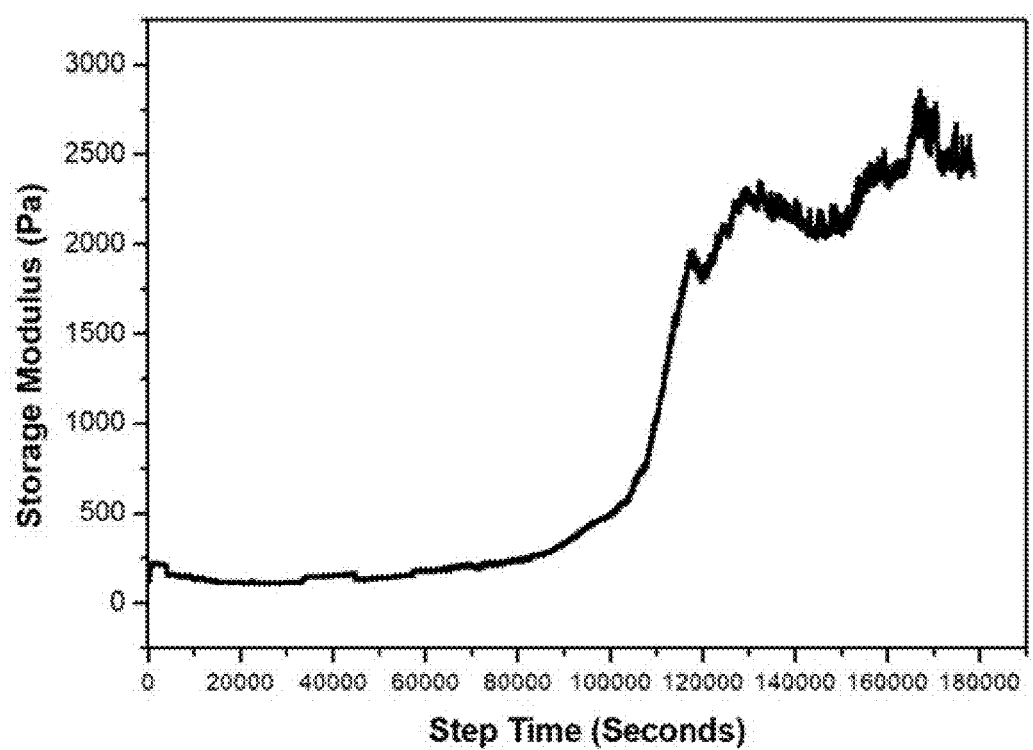
FIG. 9 is a graph illustrating the gelation kinetics of emulsion II at 95 degrees Celsius.
Figure 10:
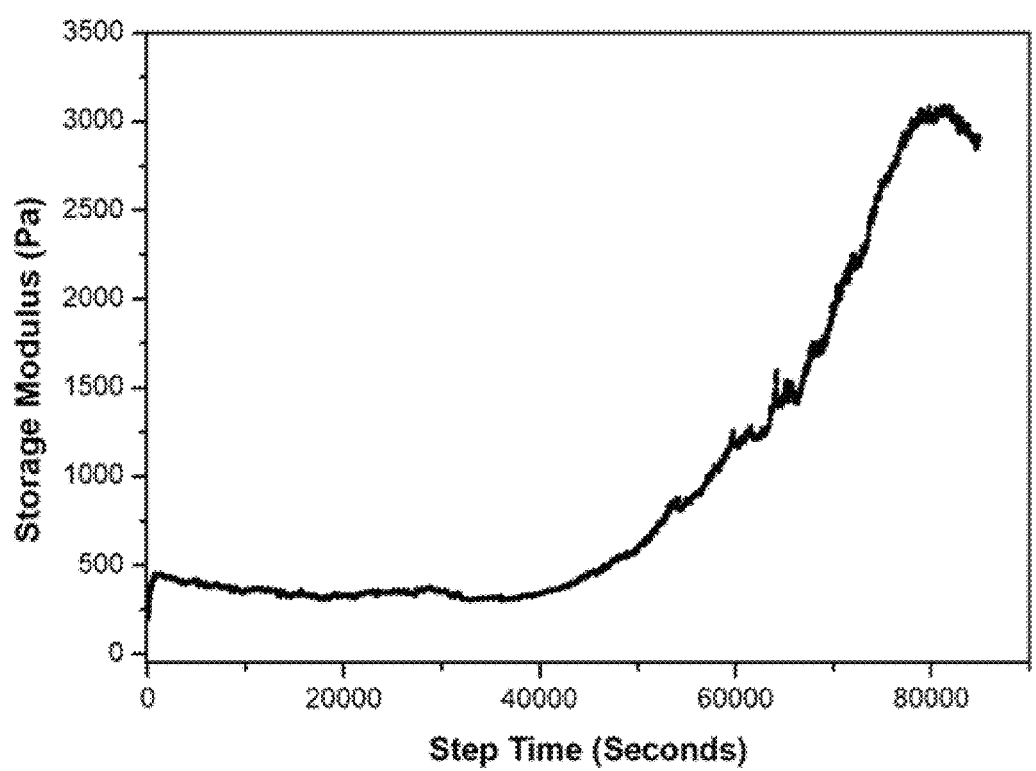
FIG. 10 is a graph illustrating the gelation kinetics of emulsion III at 95 degrees Celsius.

In FIG. 8, it can be clearly seen that the gelation in the emulsion I (0.5 wt. % NaCl) at 95° C. did not take place up to 30 hrs, whereas in emulsion II (1.0 wt. % NaCl) the point of inflection can be seen at approximately 27 hours (FIG. 9). Similarly, the point of inflection of the emulsion III (1.5 wt. % NaCl) was obtained approximately after 11 hours (FIG. 10).

This indicates that for the gelation of the silane modified colloidal silica the two factors—temperature and the concentration of the activator (NaCl)—were equally important. The increase in the concentration of activation in the emulsion solution decreased the gelation time and promoted the gelation process. Based on these results, the inventors believe that gelation time may be controlled by varying the activator concentration in the emulsified gel solution. Such control is very important when the emulsion is used in an oil field.

The emulsification of the silane modified colloidal silica was tried and tested as the conformance control system. The developed system was tested for its thermal stability, rheokinetics and gelation characteristics. Following conclusions can be derived from this study:

The silane modified colloidal silica can form stable Pickering emulsion which is a water-in-oil emulsion system. The organoclay particles (Cloisite 20A) were found to be very efficient emulsion stabilizer. The designed Pickering emulsion present the intended thermal stability characteristics. The emulsion separated into oleic phase and aqueous phase at reservoir temperature conditions. The increase in activator concentration increased the rate of oleic and aqueous phase separation, thus decreasing the stability of the emulsion. The separated silane modified colloidal silica (aqueous phase) gelled when subjected to higher reservoir temperature conditions. However, under ambient (room temperature) conditions the increase in the activator concentration does not result in much change in the gel strength.

The emulsified gel system with 1.0 wt % activator provided a gel strength of grade I (rigid gel, see Table 1) after 48 hours at 105° C. The emulsified gel system with 1.5 wt % activator provided a gel strength of grade I (rigid gel, see Table 1) after 24 hours at 105° C.

The gelation characteristics of the designed emulsified gel system can be controlled via varying the activator concentration. Furthermore, the rheokinetic study found that even with the highest tested activator concentration of 1.5 wt %, gelation took place approximately after 11 hours at 95° C. These conditions are sufficient for the proper placement of the conformance control system in a zone of interest. Consequently, based on these results, the oil-in-water Pickering emulsion as disclosed herein can effectively be used as a conformance control system in oil fields where other gel systems cause oil zone blockage.

Terminology. Terminology used herein is for the purpose of describing particular embodiments only and is not intended to be limiting of the invention.

As used herein, the singular forms "a", "an" and "the" are intended to include the plural forms as well, unless the context clearly indicates otherwise.

As used herein, the term "and/or" includes any and all combinations of one or more of the associated listed items and may be abbreviated as "/".

Links are disabled by spelling out of http: or https: The last accessed date next to a website address refers to the website content available as of that date.

The ranges disclosed herein include all intermediate values and subranges. For example, the range "1, 2, 5, 10 or 20" or "1, 2, 5, 10 to 20" includes 1, 2, 3, 4, 5, 6, 7 . . . 18, 19, and 20. Any numerical range recited herein is intended to include its endpoints and all sub-ranges subsumed therein.

As referred to herein, all compositional percentages are by weight of the total composition, unless otherwise specified.

The terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the word "include," and its variants such as "including", "includes" are intended to be non-limiting, such that recitation of items in a list is not to the exclusion of other like items that may also be useful in the materials, compositions, devices, and methods of this technology.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

The invention claimed is:

1. A method for conformance improvement in a subterranean hydrocarbon reservoir in an underground geological formation, comprising:
    mixing an aqueous phase that comprises a silane-modified colloidal silica, an oily phase and organoclay particles to form a water-in-oil Pickering emulsion,
    injecting the water-in-oil Pickering emulsion into a wellbore in the subterranean hydrocarbon reservoir in the presence of a gelation activator,
    separating the water-in-oil Pickering emulsion in the hydrocarbon reservoir under conditions sufficient for separation of the oil phase and the aqueous phase of the water-in-oil Pickering emulsion to form a continuous aqueous phase and a continuous oily phase, and
    gelling the continuous aqueous phase in the subterranean hydrocarbon reservoir under conditions sufficient for the aqueous phase to form a gel that blocks the flow of water from the hydrocarbon reservoir into the well bore.

2. The method of claim 1, wherein the gelation activator is NaCl which is mixed with the water-in-oil Pickering emulsion in an amount ranging from 0.25 to 1.5 wt % salt based on a total weight of the water-in-oil Pickering emulsion.

3. The method of claim 1, wherein the silane-modified colloidal silica comprises a water-based epoxy silane-modified colloidal silica.

4. The method of claim 1, wherein the organoclay particles comprise a phyllosilicate in an amount ranging from 0.25 to 2.00 wt. %.

5. The method of claim 1, wherein the organoclay particles comprise a montmorillonite clay modified with a quaternary ammonium salt.

6. The method of claim 1, wherein the oily phase comprises diesel oil.

7. The method of claim 1, wherein the hydrocarbon reservoir has a temperature of 90° C. to 200° C.

* * * * *